United States Patent [19]

Kraus et al.

[11] Patent Number: 4,534,886

[45] Date of Patent: Aug. 13, 1985

[54] NON-WOVEN HEATING ELEMENT

[75] Inventors: Robert G. Kraus, Attleboro, Mass.; James R. Quick, Warwick, N.Y.

[73] Assignee: International Paper Company, New York, N.Y.

[21] Appl. No.: 225,291

[22] Filed: Jan. 15, 1981

[51] Int. Cl.³ .............................................. H01B 1/02
[52] U.S. Cl. .................................... 252/502; 252/503; 252/511
[58] Field of Search .............. 252/502, 503, 510, 511, 252/512; 219/553

[56] References Cited

U.S. PATENT DOCUMENTS

| | | | |
|---|---|---|---|
| 2,985,860 | 5/1961 | Morey | 338/208 |
| 3,011,981 | 12/1961 | Soltes | 252/502 |
| 3,107,152 | 10/1963 | Ford et al. | 423/447.2 |
| 3,116,975 | 1/1964 | Cross et al. | 23/209.4 |
| 3,146,340 | 8/1964 | Dewey, II et al. | 219/520 |
| 3,149,023 | 9/1964 | Bodendorf et al. | 162/135 |
| 3,218,436 | 11/1965 | Edwards et al. | 219/544 |
| 3,305,315 | 2/1967 | Bacon et al. | 23/209.1 |
| 3,349,359 | 10/1967 | Morey | 338/208 |
| 3,359,525 | 12/1967 | Hubbuch | 338/308 |
| 3,367,851 | 2/1968 | Filreis et al. | 219/553 |
| 3,385,959 | 5/1968 | Ames et al. | 219/549 |
| 3,400,254 | 9/1968 | Takemori | 219/549 |
| 3,553,834 | 1/1971 | Olstowski | 29/611 |
| 3,627,988 | 12/1971 | Romaniec | 219/529 |
| 3,683,361 | 8/1972 | Salswedel | 338/322 |
| 3,749,886 | 7/1973 | Michaelsen | 219/528 |
| 3,774,299 | 11/1973 | Sato et al. | 29/611 |
| 3,859,504 | 1/1975 | Motokawa | 219/345 |
| 3,878,362 | 4/1975 | Stinger | 219/528 |
| 3,948,811 | 4/1976 | Clary et al. | 252/511 |
| 4,055,526 | 10/1977 | Kiyokawa | 264/22 |
| 4,058,704 | 11/1977 | Shimizu | 219/528 |
| 4,061,827 | 12/1977 | Gould | 428/368 |

Primary Examiner—Josephine L. Barr
Attorney, Agent, or Firm—Jay S. Cinamon

[57] ABSTRACT

An electrically conductive non-woven web for a heating element is formed from a non-woven sheet comprising conductive fibers which is staturated with a dispersion comprising conductive particles. Embodiments adapted for use at low voltages and at household voltages are provided. In a preferred, flame-resistant embodiment, the heating element is a sandwich containing, from bottom to top, a first insulating non-woven sheet comprising polyaramid fibers, an electrically conductive web comprising carbon fibers, polyaramid fibers, and carbon black. A pair of conductive strip attached in electrical contact to the web, and a second insulating non-woven sheet comprising polyaramid fibers.

13 Claims, 6 Drawing Figures

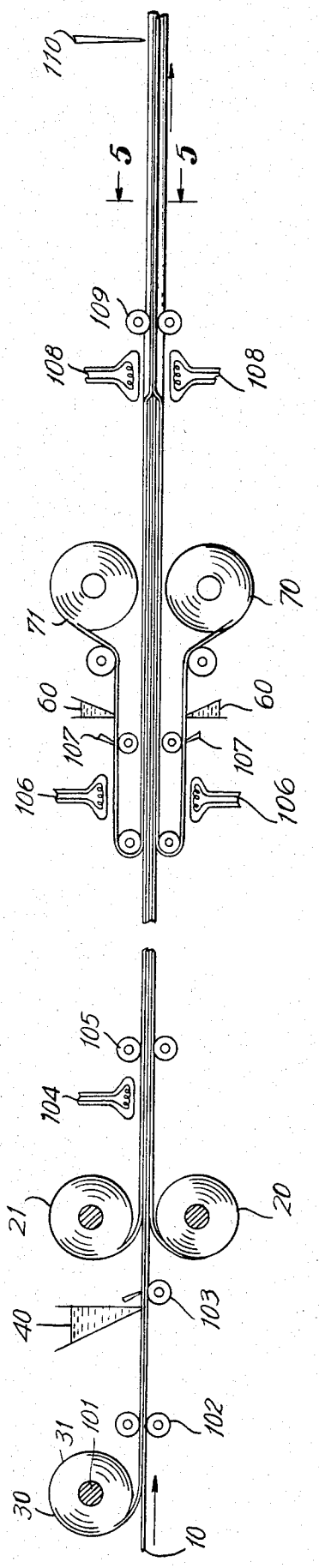
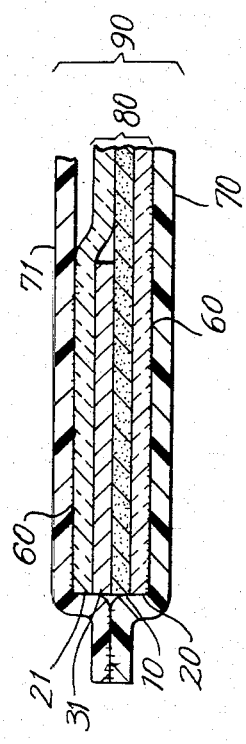
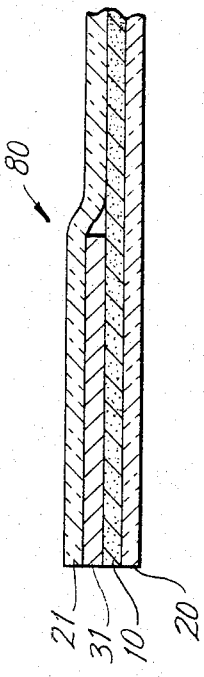

NON-WOVEN HEATING ELEMENT

BACKGROUND OF THE INVENTION

This invention relates to heating elements. In particular, it relates to a novel electrically conductive fibrous web which can provide a uniform heat over fairly large areas for sustained periods, and to a fire-resistant, sandwich-type heating element containing this web.

Heating elements capable of generating and sustaining moderate uniform temperatures over large areas are required for a variety of applications, ranging from underwater heaters to structural heating panels to heating pads and electric blankets for consumer use. Loops or grids of wire cannot provide such uniform temperatures; wires which are sufficiently fine and closely spaced to provide the required temperatures without "hot spots" are necessarily fragile and easily damaged, with the attendant dangers of fire and electrical shock. Metal sheet and foils are suitable only for the limited range of applications corrosion resistance is not required, and cost is no object. Because of the shortcomings of traditional metal wires and sheets, a great deal of effort has been devoted to developing woven and non-woven carbon fiber webs for use as heating elements. Typical nonwoven webs are described, for example, in U.S. Pat. No. 3,367,851 issued 2/6/68 to Filreis et al and in U.S. Pat. No. 3,774,219 issued 11/27/73 to Sato et al. These patents teach that short carbon fibers must be used in order to achieve a uniform sheet which will have the desired uniform heat dispersion properties. In Sato et al, "fibers of 5 to 20 microns in diameter and 3 and 10 mm or so in average fiber length are used. When the fiber length exceeds 10 mm, it becomes difficult from the technical standpoint to manufacture the electroconductive sheet containing uniformly dispersed carbon fiber therethroughout with the result that irregularity in the resistance value from place to place in the sheet becomes prohibitive" [Sat et al, col. 3, lines 20–27]. Filreis et al recommends the use of fibers having "an average fiber length from 1/16 to 7/16 inch, preferably from ⅛ to ⅜ inch. When the average fiber length falls below this lower limit the resistivity of the web at constant loading increases markedly, whereas average fiber lengths above the maximum [sic] difficult to handle and blend with the other fibers and can also tend to produce sheets with erratic resistivities from lot to lot." [Filreis et al, col 3, lines 19–26]. There are a number of disadvantages, however, inherent in making non-woven conductive webs with short carbon fibers. Conductivity varies roughly as the square of fiber length in a non-woven; consequently, in order to obtain a given conductivity much higher percentages of shorter fibers must be used. Certain desireable mechanical properties, such as web strength and flexibility, also improve significantly with increased average fiber length. The necessity of loading the web with large quantities of short carbon fiber makes it difficult to produce acceptable physical properties in webs made on commercial machines. Finally, since uniform dispersion of the short carbon fibers is so critical to the electrical properties of the web, cellulose is the preferred non-conductive fiber; the non-conductive fiber content of the web must be selected with dispersability and compatibility with carbon fibers as the primary considerations. Papers and plastic sheets loaded with conductive particles, such as metal flakes and carbon black, have also been tried but the excessive loading requirements and poor mechanical properties are even more pronounced in these.

SUMMARY OF THE INVENTION

The present invention seeks to overcome these disadvantages by providing an electrically conductive non-woven web with superior mechanical properties which contains both conductive fiber and conductive particles. Surprisingly, it has been found that the electrical and mechanical properties of the web are more uniform and can be better controlled when conductive fibers and particles are used together than when either is used alone. It is preferred that a non-woven containing both conductive and non-conductive fibers be formed and then saturated with a dispersion containing conductive particles. To maximize the benefits from the combination, the average length of the conductive fibers is preferably ½" or more. It is also preferred that the non-conductive fibers be polyaramids.

In a preferred embodiment of the invention, a heating element is provided which consists of a sandwich containing, from bottom to top, an insulating sheet; a non-woven sheet containing conductive fibers and non-conductive fibers which is saturated with a water-based dispersion containing conductive particles; two or more highly conductive strips; and a second insulating sheet. In the most preferred embodiment, which provides temperatures in the range of 100°–175° F. at standard household voltages, the insulating sheets are non-wovens made of a polyaramid fibers, the total fiber content of the conductive sheet is a combination of 1–20%, and preferably 5–10% carbon fibers and 80–99% and preferably 95–100% polyaramid fibers, the dispersion contains carbon black particles, the conductive strips are copper tapes, and the entire sandwich is held together with an epoxy.

The heating element of my invention is particularly well-shaped for consumer uses such as heating pads. It is inexpensive to manufacture and more durable than the wire elements used in conventional heating pads. It will provide an even, moderate temperature without "hot spots" which can burn the user. The preferred embodiment is flame resistant. An embodiment capable of providing a uniform temperature in the range of 50°–175° F. at a voltage of less than 25 volts is provided; heating pads made in accordance with this embodiment may be twisted, immersed in water, or even cut without increasing the risk of fire or electric shock. The low-voltage embodiment is also suitable for use as a self-contained, battery-powered heating element.

BRIEF DESCRIPTION OF THE DRAWINGS

FIG. 3A is a schematic view of an assembly line for producing the heating element of FIGS. 2 and 4, and FIG. 3B is a schematic view of an assembly line for producing the heating pad of FIG. 5 from the heating element of FIGS. 2 and 4.

FIG. 4 is a cross-sectional view of the heating element of FIG. 2.

FIG. 5 is a cross-sectional view of a fully assembled heating pad incorporating the heating element shown in FIGS. 2 and 4.

DETAILED DESCRIPTION OF THE INVENTION

Figure 1:
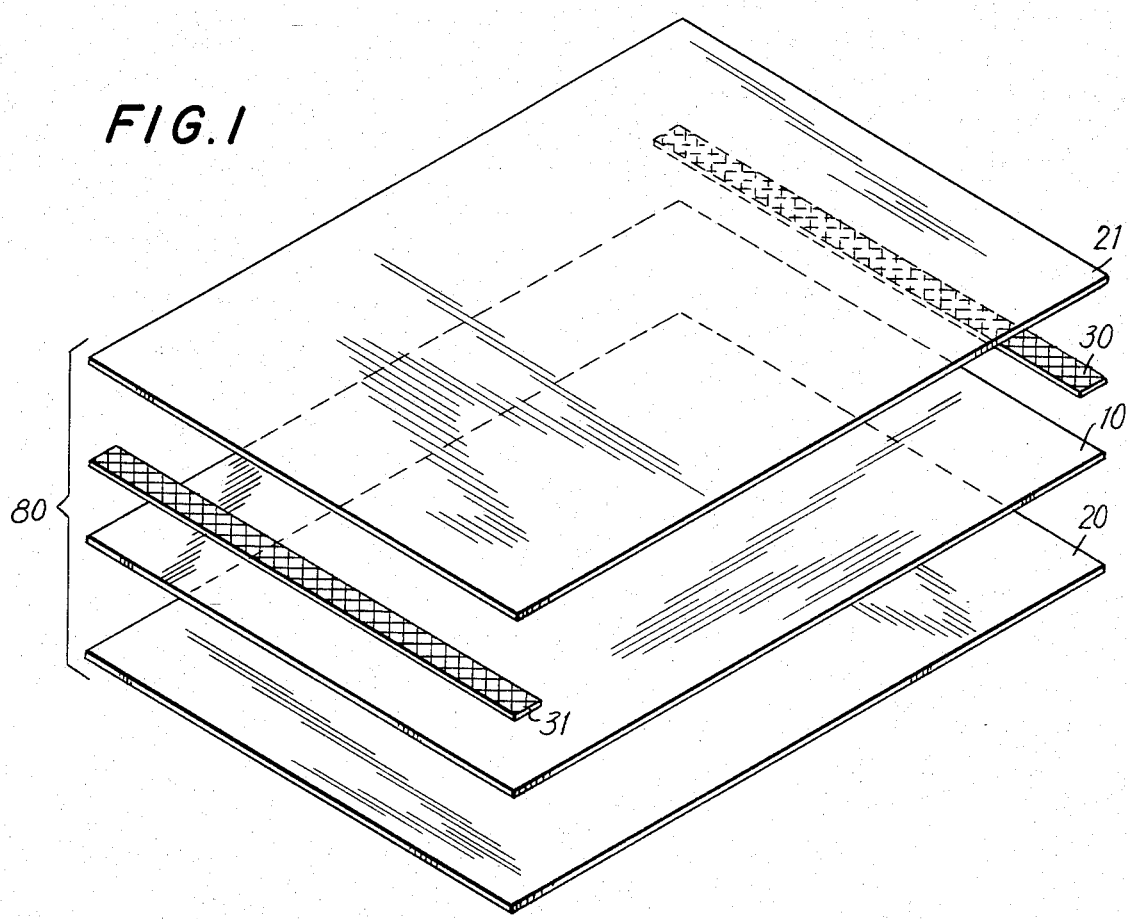
FIG. 1 is an exploded view of a heating element constructed in accordance with one embodiment of my invention.

In accordance with the invention, an electrically conductive web containing conductive fibers, non-conductive fibers, and conductive particles is provided. A non-woven sheet of conductive and non-conductive fibers is formed, saturated with a dispersion containing the conductive particles and then dried.

The conductive sheet may be formed by standard wet-laid manufacturing methods from conductive fibers, non-conductive fibers, a binder, and optional flame retardants. Suitable wet-laying techniques are discussed, for example, in U.S. Pat. No. 4,007,083 issued 2/8/77 to Ring et al., U.S. Pat. No. 4,049,491 issued 9/20/77 to Brandon et al, and U.S. Pat. No. 4,200,488 issued 4/29/80 to Brandon et al which are herein incorporated by reference. The amount of conductive fiber required will depend upon the type of conductive fiber chosen; the voltage at which the heating element is to be used; and the physical configuration of the heating element, which will determine the current path through it. Lower voltages and longer current paths require relatively more conductive fiber.

Conductive fibers which have electrical resistances of 25,000 ohm/cm or lower, preferably in the range of 25 to 15,000 ohm/cm, and which have melting points higher than about 400° F. should be chosen. Conductive fibers which are non-flammable, and are not brittle are preferred. Neither their resistances nor their mechanical properties should be much affected by temperature variations in the range of 0°–400° F. Other factors such as low water absorption, allergenic properties, and adhesive compatibility may also enter into the selection processes. Suitable fibers include carbon, nickel-coated carbon, silver-coated nylon, aluminized glass, copper, aluminum, and a variety of other metals.

Carbon fibers are preferred for use in heating elements for consumer applications such as heating pads since they have all the desired characteristics, are relatively inexpensive, and can be used in small but manageable concentrations to provide the desired heat output at standard household voltages. At 110 volts (standard household voltage), the carbon fiber content should be 1 to 20%, and preferably 5 to 10% by weight of the total fiber content of the non-woven.

Heating elements for use at extremely low voltages may also be produced in accordance with this invention. 25 volts, for example, is the maximum shock-proof voltage. In order to protect their patients, most hospitals and nursing homes require that their heating pads operate at this voltage. There are a number of potential applications for battery-powered heating elements, but these elements may operate at 12 volts or less. There has been a long-felt need for a heating element which could maintain temperatures in the range of 50°–175° F. at these voltages. While low-voltage heating elements may be manufactured in accordance with my invention by increasing either the concentration of conductive particles or the percentage of conductive fibers in the element, it is preferred that only the conductive fiber content be substantially increased. Since long conductive fibers may be used, the conductivity of the sheet may be significantly increased without sacrificing its mechanical properties. Because of their high conductivity, metal-coated fibers such as silver-coated nylon and nickel-coated carbon are suitable alternatives to carbon fibers for these applications, but carbon fibers and carbon fiber/metal-coated fiber mixtures have also been used successfully. It has been found, for example that both 100% carbon fiber non-woves and 59% silver-coated nylon fiber non-woven will provide constant temperatures of over 100° F. at 12 volts.

The conductive fibers used may be one length or a mixture of lengths. The constraints of the wet laid process dictate that the minimum length be about ⅛ of an inch and the maximum length be on the order of 1½ or 2 inches. A mixture of lengths is preferred, since the short fibers give the sheet more uniform resistivity while the longer fibers, which use less material to get substantial electrical contact, are more economical and also tend to increase the mechanical strength of the web. It is also preferred that the average length of the fibers in the mixture be at least about ½ inch. When carbon fibers are used at least 20% should be short fibers, i.e. ½ inch or less, to insure a uniform sheet with no "hot spots". A 50/50 mixture of ¼ inch fibers and ¾ inch fibers has been used successfully.

The remaining fiber content of the non-woven sheet is non-conductive fiber. The non-conductive fiber chosen must be suitable for the production of wet-laid non-wovens, have a high dielectric strength and a relatively high melting point, at least 250° F. and preferably at least 400° to 450° F., and be non-abrasive to the conductive fiber selected. The non-conductive fibers should also absorb relatively little water, to prevent blistering of the heating element, and should not be brittle. It is preferred that the fibers be relatively non-flammable as well. Other factors, such as adhesive compatability, suitability for human skin contact, and cost, may also influence the selection of the non-conductive fiber. Suitable non-conductive fibers include: glass, polyester, aromatic polyamides, vinyl, polypropylene, nylons, asbestos, and other mineral fibers. NOMEX ® and KEVLAR ®, two polyaramids manufactured by Dupont, are most preferred on account of their flame-resistant properties. It has been found that when direct flame from a Bunsen burner is applied to heating elements manufactured in accordance with the invention from 5% carbon fiber and 95% NOMEX ® fiber, the flame will not propagate beyond the immediate vicinity of the burner. It has also been found that this element is self-extinguishing. For applications where flame resistance is not required, cellulose fibers may be used as well. To be suitable for the wet-laid manufacturing process the non-conductive fibers should be at least ⅛ inch long but not longer than 1½ to 2 inches.

The total fiber content, by weight, of the sheet, including both conductive and non-conductive fibers, should be from 80 to 98% of its total weight. The balance of the dried weight of the sheet should consist of a polymeric binder, preferably a water-based dispersion such as a polymeric dispersion in powder form. Water-based dispersions or powdered poly(ethylene isothalate) modified with hydrophilic groups such as carboxyl sulfonate or phosphate groups are suitable. Alternatively, the binder may be a water-based latex such as an SBR latex, an ethylene-vinyl acetate copolymer latex or an ethylene-vinyl chloride copolymer latex. Additives such as organic phosphoros compounds and brominated aromatic compounds may be included to impart additional flame retardant properties to the sheet. The total dry weight of the conductive non-woven made is preferably between 0.75 and 2 ounces per square yard although mats as light as 0.35 ounces per square yard have also been used successfully.

After the sheet is formed it must be saturated with a water-based or solvent based dispersion containing a polymeric binder, conductive particles, and optional flame retardants. A water-based dispersion is preferred because it can be applied using conventional web-saturating equipment. A water-based dispersion may also contain a water-soluble polymer to improve its wetting characteristics, and curing agents such as oxalic acid. Any polymeric material which is readily handled in the form of a water-based dipersion may be used to form the dispersion, such as, for example, an aqueous dispersion of powdered poly(ethylene isophthalate) modified with hydrophilic groups. Alternatively the polymeric binder may be used in the form of a water based latex such as an SBR latex, an ethylene-vinyl acetate copolymer latex or an ethylene-vinyl chloride copolymer latex. Carbon black is a preferred conductive material because of its low cost but any conventional material in particulate form such as metal flakes or powders, may be used. The final weight of the saturated sheet should be from 110% and 300% of the weight of the original sheet so that from 10% to 67% of the final dry weight comes from dispersion. From 5 to 50%, and preferably about 15% to 45% of the final weight will be conductive particles. The conductive particles increase the conductivity of the mat and prevent "hot spots" caused by non-uniform fiber dispersion. Vulcan XC-72 carbon black has been used successfully in an ethylene vinyl acetate dispersion.

Referring now to the drawings, FIG. 1 shows the components of a heating element constructed in accordance with the preferred embodiment of my invention. The heating element, indicated generally at 80, comprises, from top to bottom, a first insulating sheet, 21, a pair of conductive strips, 30 and 31, a conductive sheet, 10, and a second insulating sheet, 20. The conductive sheet, 10, contains conductive particles, conductive fibers, and non-conductive fibers as previously described. In the most preferred embodiment, conductive sheet, 10, is a non-woven comprising 1–20% or preferably 5–10% fibers and 80–99% preferably 90–95% aromatic polyamide fibers, the average lengths of the fibers being at least $\frac{1}{2}$", which is saturated with a carbon black dispersion comprising from 5 to 50%, and preferably about 15 to to 45% of the final dry weight of the sheet.

In the preferred configuration, two highly conductive strips, 30 and 31, are attached in electrical contact with the electrically conductive web in parallel. The conductive strips may be in the form of tapes made of copper, woven steel wire, braided aluminum, wire, or non-woven carbon fiber. The strips may be secured by adhesive bonding, mechanical attachment, e.g. sewing or stapling, interweaving with the conductive web, or if the tape is fusible, by heat bonding. Alternatively, strips of conductive coating may be painted directly onto the conductive sheet. In one embodiment, non-woven tape comprised of carbon and polypropylene fibers was melted onto the conductive web. In another, copper tape was attached to a carbon fiber and NOMEX® conductive sheet with a pressure sensitive adhesive. In another instance, strips of conductive nickel coating were successfully used. If a shorter current path is desired, additional conductive strips may be applied.

In the preferred configuration, the conductive web 10 and the conductive strips, 30 and 31 are sandwiched between a pair of insulating sheets, 20 and 21. If extremely low voltages, e.g. 12 volts, are used, full insulating sheets may be necessary to protect the user from shock or burns, but even then some insulation will be required for the conductive strips. While the insulating sheets are primarily used for protection from heat and electric shocks, they may also serve a cosmetic purpose. For consumer application such as heating pads, any insulator which is approved by Underwriters Laboratories for electrical devices carrying household current may be used. About 2,000 acceptable insulators are listed by Underwriters Laboratories, including vinyl, silicone rubber, ordinary rubber, nylons and fiberglass. The insulator chosen should be thin, flexible and relatively non-flammable. Cost and adhesive compatability may also be considerations. We have found it preferable to use non-woven sheets made of the non-conductive fibers which are used in the conductive sheet. The preferred fibers are aromatic polyamids such as NOMEX and KEVLAR. The fiber lengths should be between $\frac{1}{8}$ inch and 1-$\frac{1}{2}$ to 2 inches. The sheets may be formed by conventional manufacturing methods for wet-laid nonwovens. It is preferred that the thickness of each non-conductive insulating sheet be in the range specified by Underwriters Laboratores.

In most cases, it will be preferable to attach the conductive web to the insulating sheets with an adhesive. If, however, a non-woven containing fibers with a relatively low melting point is used as the insulator, heat-bonding the sandwich may be more economical. Depending on the choice of non-conductive fiber, any one of a variety of adhesives may be chosen. The adhesive must adhere well to the conductive web, the insulating sheets, and the conductive strips. However, it must not significantly affect the resistivity of the conductive web. Suitable adhesives include low viscosity epoxys, silicone adhesives, solvent-based or hot-met polyamides, and polyester adhesives.

Figure 2:
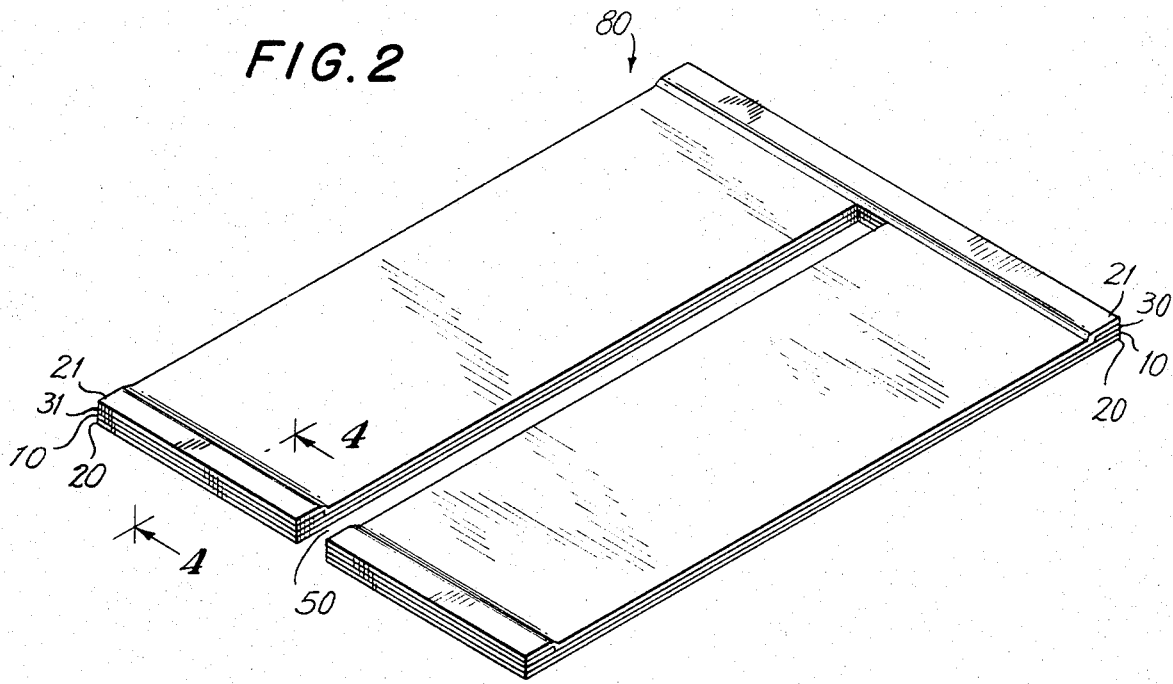
FIG. 2 is a top perspective view of an assembled heating element embodying my invention.

The assembled heating element, 80, shown in FIG. 2. A cross-sectional view of the assembled element is shown in FIG. 4. For most applications, it is preferred that the heating element 80 be cut into the form of a rectangle with the conductive strips 30 and 31 arranged in parallel rows. This configuration is suitable for in-line roll lamination and cutting, and for providing a uniform heat output per unit area. Slitting is used to lengthen the current path, thereby reducing the heat output per unit area. The preferred design for heating pads is a "U-shape" with one central slit, 50, since this configuration makes it possible to attach all of the lead wires at one location. The heat output of the element may be modified either by changing the number of slits, or by changing the shape of the rectangle. Since the resistance per unit area is a constant, lengthening the distance between conductive strips while keeping the width of the element constant will reduce both the total heat output and the heat output per unit area. Widening the pad so that the conductive strips are lengthened will increase the total heat output, although heat output per unit area will remain constant.

In alternative embodiments, the element can be structured to give a choice of heat settings. One way of doing this is to use three conductive strips located on the edges and the center of an unslit rectangular conductive web. To obtain a high heat the central strip is connected to one side of the power source as the positive pole while both edge strips are connected to the other side as negative poles. A lower heat is obtained when the central strip is deactivated. Each edge strip is then connected to one side of the power supply to become the negative and positive poles. Alternatively, two or more conductive sheets, each with a different resistivity and separate leads, may be sandwiched between the insulating sheets. Each sheet may be activated separately or, for maximum heat output, all of the conductive sheets may be activated.

The preferred process for producing rectangular units is roll lamination. A schematic diagram of a suitable assembly line is shown in FIG. 3A. The conductive web, 10, is roll fed into the assembly line in the proper width for a finished unit. Conductive strips, 30 and 31, and unrolled from roller 101 onto the sheet and secured to it by pressure rollers 102. An epoxy or other adhesive, 40, is applied by saturating the conductive web with calendaring means 103. The insulating sheets 20 and 21 are then roll fed onto the line. Heating assembly 104 and pressure rolls 105 are used to laminate the three to form a sandwich. If it is desired, the completed sandwich may then be knife or die slit.

Underwriter's Laboratories require that heating pads made to their specifications be double insulated. The cross-section of a double-insulated heating pad, indicated generally by 90, in accordance with the invention is shown in FIG. 5. Other insulating sheets 70 and 71 are laminated to the assembled heating element with a suitable adhesive 60. While any insulator approved by Underwriter's Laboratories for electrical devices carrying household current may be used, the preferred insulator is vinyl. Suitable adhesive include low-viscosity epoxies, silicone adhesives, solvent-based or hot-melt polyamide adhesives, and polyester adhesives.

FIG. 3B is a schematic diagram of an assembly line for manufacturing pad 90 from assembled heating element 80. An adhesive, 60, here a hot-melt adhesive, is applied to outer insulation sheets 70 and 71 by calendaring mechanism 107, and heated with heating assembly 106. Assembled heating element 80 is fed between insulating sheets 70 and 71 to form a sandwich which is laminated by heating assembly 108 and pressure rolls 109. It is preferred that insulating sheets 70 and 71 be slightly wider than assembled element, 80, as shown in FIG. 5. The laminated sandwich is then cut to size by knife 110 to form pads 90.

While a rectangle is the preferred configuration for heating pad applications because of the uniform heat output and ease of manufacturing, other configurations are also possible. For example, a disc-shaped element could be produced with a conductive point at the center and conductive edging on the perimeter. This configuration would have a maximum heat output near the center of the disc, tapering off towards the edge, and might be suitable for a hot plate or wall heating unit. Rectangular elements might also be molded or die-cutto form heating elements shaped to fit such body parts as knees, arms, and shoulders.

Heating elements made in accordance with this invention are also suitable for use as, for example, radiant wall heaters, electric blankets, pipe heaters, battery warmers, portable heating and warming units, immersion heaters for pools and aquariums, hen-house warmers and for many other consumer, industrial and agricultural applications. In addition this invention to various uses and conditions, many modifications will be obvious to those skilled in the art. In view of this, the following claims are intended to cover all modifications and variations which fall within the true scope and spirit of the invention.

What is claimed is:

1. An electrically conductive non-woven web for a heating element comprising, in combination, conductive fibers having melting points no lower than about 400° F., electrical resistances no greater than about 25,000 ohm/cm, and lengths in the range of from about ⅛ inch to about two inches, and conductive particles, the conductive particles comprising from about 5% to about 50% of the final dry weight of the web.

2. An electrically conductive non-woven web in accordance with claim 1 further comprising non-conductive fibers having high dielectric strengths, melting points no lower than about 250° F., and lengths in the range of from about ⅛ inch to about two inches.

3. An electrically conductive non-woven web in accordance with claim 2 wherein the average length of the conductive fibers is at least about ½ inch.

4. An electrically conductive non-woven web in accordance with claims 2 wherein the conductive fibers are selected from the group consisting of carbon fibers, metal fibers, and metal-coated fibers.

5. An electrically conductive non-woven web in accordance with claim 2 wherein the conductive fibers are selected from the group consisiting of carbon fibers, nickel-coated carbon fibers, silver-coated nylon fibers, and aluminized glass fibers.

6. An electrically conductive non-woven web in accordance with claim 2 wherein the conductive particles are selected from the group consisting of carbon black, metal powders, and metal flakes.

7. An electrically conductive non-woven web for a heating element comprising a non-woven sheet saturated with from about 10% to about 67% by the final dry weight of the web of a dispersion comprising conductive particles and a polymeric binder, the non-woven sheet comprising conductive fibers having melting points no lower than about 400° F., electrical resistances no greater than about 25,000 ohm/cm, and lengths in the range of from about ⅛ inch to about two inches, and the conductive particles comprising from about 5% to about 50% of the final dry weight of the web.

8. An electrically conductive non-woven web in accordance with claim 7 wherein the non-woven sheet further comprises non-conductive fibers having high dielectric strengths, melting points no lower than about 250° F., and lengths in the range of from about ⅛ inch to about two inches.

9. An electrically conductive non-woven web in accordance with claim 7 wherein the average length of the conductive fibers is at least about ½ inch.

10. An electrically conductive non-woven web in accordance with claim 9 wherein the dispersion is a water-based dispersion.

11. An electrically conductive non-woven web in accordance with claim 9 wherein the conductive particles are carbon black.

12. An electrically conductive non-woven web in accordance with claim 11 wherein the dry weight of the non-woven sheet is in the range of about 0.35–2 oz/sq/yd.

13. An electrically conductive non-woven web in accordance with claim 9 wherein the conductive fibers comprise a mixture of conductive fibers having a length greater than about ½" and conductive fibers having a length less than about ½".

* * * * *